United States Patent [19]

Jinkins et al.

[11] 4,289,814

[45] Sep. 15, 1981

[54] STABILIZED PHENOLIC RESINS

[75] Inventors: C. Eugene Jinkins, Freeport; Bobby Legler, Lake Jackson, both of Tex.

[73] Assignee: The Dow Chemical Co.

[21] Appl. No.: 149,089

[22] Filed: May 12, 1980

Related U.S. Application Data

[62] Division of Ser. No. 5,738, Jan. 23, 1979, Pat. No. 4,235,762.

[51] Int. Cl.$^3$ .................. B05D 7/26; C08L 61/10
[52] U.S. Cl. .................. 427/385.5; 260/29.3; 427/388.3; 427/388.4; 427/389.7; 428/436; 428/457; 428/524
[58] Field of Search .............. 427/393.5, 388.3, 388.4, 427/389.7, 385.5; 428/524; 260/29.3

[56] References Cited

U.S. PATENT DOCUMENTS 2,655,490 10/1953 Sonnabend et al. .................. 260/38
4,033,909 7/1977 Papa .................. 260/2.5 F

OTHER PUBLICATIONS

Chemical Abstract 67:54479q, Vysokomol, Soedin, Ser. A. 9(5), 1058–1065 (1967).
Chemical Abstract 70:78701u, Mekh. Polim. 4(6), 1033–1042 (1968).

*Primary Examiner*—Theodore E. Pertilla

[57] ABSTRACT

The addition of a water-absorbent, finely divided powder to a phenolic resole resin provides a stabilized resin composition which cures in the presence of an acid catalyst at ambient temperatures to a relatively thick coating having a reduced number of defects, e.g., pinholes and blistering. For example, a resole resin composition containing a stabilizing amount of fumed silica can be blended with a mixture of benzene sulfonyl cloride and trichloroacetic acid, applied to a substrate and cured to form an essentially defect-free coating.

8 Claims, No Drawings

STABILIZED PHENOLIC RESINS

CROSS REFERENCE TO RELATED APPLICATION

This application is a divisional of our previously filed application Ser. No. 5,738, filed Jan 23, 1979 U.S. Pat. No. 4,235,762.

BACKGROUND OF THE INVENTION

This invention relates to phenolic resole resins, particularly to stabilized phenolic resole resin compositions and to the cured compositions prepared therefrom.

Thermoset phenolic resins are known to exhibit excellent physical properties, e.g., strength and adhesion, and excellent chemical properties, such as resistance to attack by various solvents and acids. Due to these properties, phenolic resins are used extensively in coating applications, particularly as protective coatings for containers, air conditioning equipment, water tanks and the like.

It is well known in the art that the condensation reaction of an aldehyde with a phenol provides materials curable to thermoset phenolic resins. Base-catalyzed condensation reactions of at least a stoichiometric amount of an aldehyde with a phenol provide a condensate known as a phenolic resole resin or A-stage resin. Alternatively, acid catalyzed condensation of a phenol with less than a stoichiometric amount of aldehyde provides a phenolic novolak resin. Characteristically, phenolic resole resins can be heat cured to fully cross-linked, infusible resins (commonly referred to as C-stage resins) without the need for added cross-linking agent. From this standpoint, they are more descriptively referred to as one-step resins in contrast to phenolic novolaks (two-step resins) which require the addition of a cross-linking agent for curing.

Unfortunately, resole resins are unstable. Frequently, upon standing, this instability is evidenced by the formation of a distinct water rich phase, which phase generally separates from the remainder of the resole resin. Often, under normal storage and shipping conditions, this instability imparts to the resin undesirable handling characteristics and renders the resin unusable.

Heretofore, several methods have been proposed for improving the stability of the resole resins. For example, it is known that reducing the mole ratio of the reactants, i.e., moles of aldehyde per mole of phenol, provides a more stable resin. See, for example, Polymer Processes, edited by Calvin E. Schildknecht, published in 1956 by Interscience Publishers, Inc., New York, Chapter VIII. Unfortunately, the reduced aldehyde content in the resin increases the curing temperature required to prepare the C-stage resin.

Alternatively, U.S. Pat. No. 1,802,390 discloses that maintaining the resole resin in an alcohol will increase the resin's stability. Unfortunately, the volatile material, i.e., the alcohol, promotes the formation of pinholes and similar defects in coatings prepared therefrom.

Similarly, U.S. Pat. No. 2,937,159 teaches that the addition of a small amount of certain aliphatic polyamines to the resole resin will increase the stability thereof. Unfortunately, coatings and other products formed therefrom exhibit a reduced resistance to chemical attack.

In view of the stated deficiencies of the prior art compositions, it remains highly desirable to furnish a stabilized phenolic resole resin which when applied to a suitable substrate will cure at relatively low temperatures to a chemically resistant coating substantially devoid of imperfections.

SUMMARY OF THE INVENTION

Accordingly, one aspect of the present invention is a stabilized phenolic resole resin composition comprising a phenolic resole resin and an amount of a finely divided, water-absorbent powder sufficient to reduce the amount of a distinct water rich phase formed in the resin composition.

Another aspect of the present invention is a method of preparing a coating from said stabilized phenolic resole resin composition, said method comprising the steps of (1) adding to the stabilized resin composition a catalytic amount of an acid, (2) applying the catalyzed resole resin composition to a suitable substrate and (3) subjecting the catalyzed resin composition to conditions sufficient to cure the resin.

Yet another aspect of the present invention is a normally water-insoluble substrate coated with the cured, stabilized phenolic resole resin composition.

Surprisingly, the addition of the finely divided, water-absorbent material to the phenolic resole resin reduces the formation of a distinct water rich phase therein. Moreover, upon the addition of an acid catalyst, the resole resin compositions of the present invention cure at relatively low temperatures, with a room temperature cure being effective in many applications. Unexpectedly, upon cure, a coating devoid of imperfections is formed. By the term "coating devoid of imperfections" is meant a coating which under visual inspection with no magnification is essentially devoid of pinholes, holidays and other similar defects.

The stabilized phenolic resole resin compositions of this invention are useful in coating and adhesive applications. Upon curing, the resin compositions form strong, durable coatings which are resistant to chemical attack by many chemicals such as strong acids, e.g., hydrochloric acid, and various solvents, particularly chlorinated solvents.

DETAILED DESCRIPTION OF THE PREFERRED EMBODIMENTS

For the purposes of this invention, a phenolic resole resin is the reaction product of at least one phenol with at least one aldehyde, the aldehyde being employed in a molar excess with respect to the phenolic.

As the term is used herein, a "phenol" includes any phenolic compound capable of reacting with an aldehyde to form a resole resin, particularly those phenols employed heretofore in the preparation of resole resins. Representative examples of such phenols include phenol (benzophenol); alkyl substituted phenols such as cresol, xylenol, cardanol, p-tert butylphenol and the like; phenylphenol; resorcinol and the like. Combinations of such phenolic compounds are also advantageously employed. Preferred phenols include phenol, resorcinol, 2,4-xylenol and m-cresol; with phenol being especially preferred.

By the term "aldehyde" it is meant an aldehyde capable of reacting with a phenol, as hereinbefore described, to form a resole resin, particularly those aldehydes used heretofore in the preparation of resole resins. Representative examples of such aldehydes include formaldehyde (advantageously in the form of an aqueous solution such as formalin); formaldehyde yielding materials such as paraformaldehyde; acetaldehyde; furfural; butyraldehyde and the like. Preferred aldehydes are formaldehyde and paraformaldehyde, with formaldehyde being especially preferred.

The phenolic resole resin is prepared by reacting a molar excess of the aldehyde with the phenol in the presence of an effective amount of a base catalyst. Advantageously, the proportion of aldehyde to phenol being reacted is from about 1 to about 2.5, preferably from about 1.1 to about 1.8, most preferably from about 1.3 to about 1.5, moles of aldehyde per mole of phenol. Base catalysts advantageously employed and the effective amounts of such catalysts are those which are commonly employed in the art. Typically, ammonia or a metal hydroxide such as calcium hydroxide or sodium hydroxide are effectively employed as a base catalyst, advantageously, at concentrations from about 2 to about 4 weight percent based on the weight of the phenol. Methods for preparing resole resins are well known in the art and such conventional methods are suitably employed in this invention. Illustrative of such methods is presented in *Polymer Processes*, edited by Calvin E. Schildknecht, published in 1956 by Interscience Publishers, Inc., New York, Chapter VIII (pages 295-350).

The finely divided, water-absorbent powders useful in the practice of this invention include those materials which are insoluble in the phenolic resole resin and which (1) have a number average particle size of less than about 5000 Å, preferably less than about 500 Å, more preferably less than about 200 Å and (2) are capable of absorbing at least about 1, preferably at least about 2, more preferably at least about 5, times their weight in water. For the purposes of this invention, the particle size of the powder is the primary particle dimension of the particle as determined by conventional techniques such as microscopic techniques similar to those disclosed by ASTM E 20-68. Water absorbance is also determined by conventional techniques, e.g., comparing the weight of the dry powder with the weight of the wet powder after the maximum amount of water has been absorbed thereby.

Of such materials, fumed powders such as fumed silicon dioxide, fumed titanium dioxide and fumed aluminum oxide are preferred. Advantageously, such fumed powders have a number average particle size of less than 400 Å, preferably less than 200 Å, when the particle size is determined from the surface area assuming the particles to be spherical in shape. The surface area is determined by the nitrogen adsorption method of Brunauer, Emmett and Teller as disclosed in the *Journal of the American Chemical Society*, Vol. 60, published in 1938, page 309.

Methods for preparing such fumed inorganic powders are well known in the art and reference is made thereto for purposes of this invention. A conventional method involves the flame-hydrolysis of a suitable gas, e.g., $TiCl_4$ or $SiCl_4$, by reacting the gas in a flame of hydrogen and oxygen to form the fumed inorganic plus hydrochloric acid.

In the practice of this invention, the finely divided powder is mixed with the resole resin in an amount sufficient to reduce the amount of a water rich phase, which phase is distinct from the remainder of the resole resin composition. Such amount is also advantageously an amount which does not adversely and significantly affect the resin's physical and chemical properties upon cure, e.g., does not promote the formation of pinholes, holidays and other imperfections in coatings prepared therefrom. For the purposes of this invention, the amount of a distinct water rich phase formed in the resin is presumed to be reduced, i.e., the phenolic resole resin is presumed to be stabilized, when the amount of water or water rich material which forms a distinct phase, i.e., a phase which is visibly separate from the remainder of the resin composition such as in a well defined layer or as a plurality of discontinuous droplets in a continuous phase of the resin composition, is measurably reduced. By "measurably reduced" it is meant that such water or water rich phase is reduced by a measurable amount using test conditions hereinafter described.

Experimentally, the stabilizing effect of the finely divided, water absorbent powder on a resole resin is determined by the following procedure. The resole resin to be tested is prepared by conventional techniques. To a portion of the resin is blended the finely divided powder at its desired concentration. A second portion of the resole resin remains neat, i.e., it contains no powder. Equal amounts by weight of each resin portion are subjected to extended storage in a closed container at room temperature, e.g., 25° C., for an extended period of time, e.g., 2-12 months. At the end of this storage period, each resin portion is examined for a water rich phase, which phase, if present, generally resides on the top of the remainder of the composition. The amount of any water rich phase is measured by conventional techniques. For the purposes of this invention, the resin composition containing the finely divided powder is presumed to be stabilized whenever the amount of the water rich phase is less than the amount of the water rich phase in the neat resole resin.

Advantageously, the finely divided powder is employed in an amount sufficient to reduce the amount of the water rich phase formed by at least about 20, more preferably at least about 50, percent when the resole resin and stabilized resole resin composition are compared after storage for three months at 25° C. By way of example, a phenolic resole resin which in neat form exhibits 5 g of a distinct water rich phase, has at least a 20 percent reduction in the amount of the water rich phase formed, when an identical phenolic resole resin, when stabilized, exhibits a separate water rich phase of 4 g. Most preferably, the stabilized phenolic resole resin exhibits essentially no distinct water rich phase.

The amount of the finely divided, water-absorbent powder most advantageously employed to stabilize the resin is dependent on many factors, including the specific phenol and aldehyde employed, their relative concentrations and the specific finely divided powder employed. Typically, the finely divided powder is advantageously employed at concentrations from about 0.5 to about 5, preferably from about 0.7 to about 2, weight percent, said weight percents being based on the total weight of the resole resin. As a specific example, a resole resin which is the reaction product of 1.4 moles of formaldehyde with 1 mole of phenol is advantageously stabilized with from about 1 to about 1.5 weight percent of a fumed inorganic powder based on the total weight of phenolic resole resin. The most effective concentrations of the finely divided powder are easily determined by experimental techniques as set forth herein.

In addition to the finely divided powder, it is often advantageous, although optional, to incorporate small amounts of a basic material into the stabilized resole resin. Included within the term "basic material" are organic and inorganic bases, preferably those materials having a $pk_b$ greater than about 1.0 wherein $pk_b$ is the dissociation constant of the basic group in water at 25° C., and those materials which form such bases in the presence of water. Representative basic materials useful herein include the Group IIA metal hydroxides such as magnesium hydroxide; the Group IIA metal oxides such as calcium oxide; certain transition metal oxides such as cadmium oxide and primary, secondary and tertiary amines, with tertiary amines such as benzyldimethylamine, α-methylbenzyldimethylamine, dimethylaminomethylphenol and tridimethylaminomelthylphenol being the preferred amines. When a basic material is employed, the stabilized resin composition advantageously contains from about 0.05 to about 1.0, preferably from about 0.1 to about 0.25, weight percent of the basic material, said weight percent being based on the weight of the resole resin.

Optionally, the resole resin also contains various adjuncts such as fillers, lubricants, hardeners, stabilizers and the like. Adjuncts conventionally employed and their effects on the phenolic resins are well known in the art. Reference is made thereto for the purpose of this invention. As an example of such art, reference is made to *Polymer Processes*, edited by Calvin E. Schildknecht, published in 1956 by Interscience Publishers, Inc., New York, Chapter VIII.

Of the conventional adjuncts, a filler is advantageously employed for many applications, particularly in coating applications. By the term "filler" it is meant any essentially inert material used to stiffen, harden or thicken the resole resin composition or products prepared therefrom and which reduce overall resin cost. Representative examples of fillers suitably employed in this invention are graphite flakes; expanded clays, e.g., $Al_2O_3 \cdot 3SiO_2 \cdot 2H_2O$; calcium carbonate; barytes; silicates; glass spheres; slate flour; soft clays and the like. Although many such conventional fillers possess excellent water absorbing properties, their large size generally precludes their use as the finely divided powder in this invention. However, if they are prepared in a size range sufficient to stabilize the phenolic resole resin as exemplified herein, the fillers can also be suitably employed as the finely divided powder. Fillers which have been found especially useful for coating application are graphite flakes and expanded clay. Although the concentration of the filler is not critical, concentrations from about 2 to about 20, preferably from about 3 to about 10, weight percent based on the weight of the resole resin have been found to be advantageous.

For many applications, a dispersing agent, i.e., a surface active agent which promotes uniform and maximum separation of fine solid particles, e.g., the fumed inorganic powder, is often advantageously employed. The dispersing agents which are advantageously employed in this invention are those which prevent the settling of the finely divided, water-absorbent powders, the optional fillers and other adjuncts when the resole resin is to stand for long periods prior to use, e.g., 6–12 months. Of the conventional dispersing agents, anionic or nonionic polymer type dispersing agents and mixtures thereof have been found to be most advantageous in the practice of this invention. Representative examples of such dispersing agents are di-isobutylene-maleic anhydride sodium salt, polyacrylate or polymethacrylate salts, alkyl phenol polyoxyethylene and the like. Di-isobutylene-maleic anhydride sodium salt is the most preferred. The concentration of the dispersing agent most advantageously employed depends on many factors, including the type and concentration of the resole resin, finely divided powder and fillers as well as the desired viscosity of the resin composition. Typically, concentrations of the dispersing agent from about 0.0001 to about 0.2, preferably from about 0.001 to about 0.1, weight percent based on the total parts by weight of the resole resin are advantageously employed.

Advantageously, the foregoing ingredients are employed in amounts such that upon mixing by the methods hereinafter described, a thixotropic material, i.e., a gel-like material which when subjected to mild agitation behaves like a viscous liquid, results. For example, the ingredients are advantageously employed in amounts sufficient to form a gel-like material which will flow freely on application of slight pressure such as by brushing or rolling.

The finely divided, water-absorbent powder and optional adjuncts are blended with the resole resin using conventional techniques such as a roll mill, blender or the like. Preferably, the blending is by means of a high speed mixer, e.g., a Dispersator, manufactured by the Premier Mill Corp., operating at blade speeds in the range from about 5,000 to about 20,000 rpm.

The stabilized resole resin composition can be cured to a normally solid material using conventional techniques. The catalyst, times, temperatures and other curing conditions are well known in the art and usable in the practice of this invention. Reference is made thereto for the purposes of this invention. Merely for the purposes of illustration and not for limitation, reference is made to *Organic Chemistry of Synthetic High Polymers* by Robert W. Lenz, published in 1968 by Interscience Publishers, Inc., New York, Chapter IV, "Carbonyl Addition—Substitution Reactions," pages 113–138 and 140–142 and to *Polymer Processes*, edited by Calvin E. Schildknecht, published in 1956 by Interscience Publishers, Inc., New York, Chapter VIII, "Condensations with Formaldehyde" by T. J. Suen.

In many applications, particularly coating applications, curing is advantageously carried out by adding to the stabilized resole resin composition a catalytic amount of an acid and subjecting the catalyzed resin composition to conditions sufficient to cure the resin to a normally solid material. Acid catalysts advantageously employed are those which, when employed in a catalytic amount, (1) will catalyze the cross-linking reaction of the resole resin and (2) do not coagulate the resin or cause the cured resin to exhibit catalyst strings, i.e., those string-like particles formed by the gelling of the resin. Representative examples of suitably employed acid catalysts include chlorinated acids such as mono-, di- or tri-chloroacetic acid; a salt of a weak base and strong inorganic acid such as ammonium chloride, ammonium sulfate, ferric chloride and the like; maleic anhydride and the like. A catalytic amount of the acid is dependent upon many factors including the specific acid employed, the composition of the resole resin and the cure rate desired. Typically, from about 0.1 to about 15, preferably from about 0.2 to about 10, weight percent of the acid based on the weight of the resole resin is employed. At these concentrations, a cure temperature from about 20° C. to about 100° C. is generally sufficient to cure the stabilized phenolic resole resin.

Advantageously, the acid catalyst is used in conjunction with an organic sulfonyl chloride, preferably benzene sulfonyl chloride; preferably as a mixture of from about 5 to about 50 weight percent of the acid and from about 95 to about 50 weight percent of the organic sulfonyl chloride, said weight percents being based on the weight of the acid and sulfonyl chloride.

In coating applications, the catalyzed, stabilized phenolic resole resin composition of this invention is applied to a suitable substrate by conventional methods such as brushing, rolling, spraying or the like. Suitable substrates include normally water-insoluble materials such as metals, glass or glass substitutes, or other like materials, the surfaces of which having been advantageously primed with a suitable primer, e.g., a cured epoxy or vinyl ester resin, and which are inert to the catalyzed phenolic resole resin composition and the cured composition formed therefrom. Following its application, the catalyzed composition is cured to the substrate at conditions hereinbefore described.

The following examples are set forth to illustrate the invention and should not be construed to limit its scope. In the examples, all parts and percentages are by weight unless otherwise specified.

EXAMPLE 1

To a high speed mixer is added 222 g of a resole resin which is the reaction product of formaldehyde and phenol at a molar ratio of 1.4 moles formaldehyde to 1 mole of phenol. To the resole resin is added 3 g of a fumed silica having a number average particle size of 120 Å. The resole resin and fumed silica are blended for about 5 minutes at a blade speed of about 10,000 rpm. The resulting stabilized resole resin composition (Sample No. 1) is poured into a 120 cc bottle, whic is subsequently capped, thereby making the bottle essentially impermeable to the passage of air.

In a similar manner, 222 g of an identical resole resin, except that it contains no fumed inorganic powder, (Sample No. C) is prepared and poured into a 120 cc bottle, which bottle is subsequently capped.

Each composition is stored in the capped bottle for a period of about three months at a temperature of 22° C. At the end of this storage period, each container is inspected for a water rich phase. The resole resin having the fumed inorganic powder added thereto, i.e., the stabilized resole resin composition is found to have essentially no distinct water rich phase. On the other hand, the resole resin containing no fumed silica, i.e., Sample No. C, has a distinct water rich phase laying on the top of the remainder of the resole resin composition. Upon pouring the water rich phase into a graduated cylinder, the amount of water is found to be 0.5 ml, i.e., about 0.5 g.

In this manner, by the method of this invention, a finely divided, water-absorbent powder is found to stabilize a phenolic resole resin.

In a like manner, four stabilized phenolic resole resin compositions, similar in all respects to Sample No. 1 except that each resin composition also contains 0.09 weight percent based on the weight of the resole resin of one of the following basic materials: magnesium oxide, calcium oxide, calcium hydroxide and tridimethylaminomethylphenol, are prepared. After being stored for three months at 22° C. in an essentially air impermeable container, these four stabilized resins are found to exhibit essentially no distinct water rich phase. In this manner, it is shown that the basic materials have no adverse effects on the stability of the stabilized resin composition.

EXAMPLE 2

To a high speed mixer is added 1,000 parts of a resole resin of the reaction product of a formaldehyde and phenol mixture at a molar ratio of 1.4 moles of formaldehyde to 1 mole of phenol. To the resole resin in the mixer is added 41 parts of a flaked graphite (No. 635 Graphite), 25 parts of a fumed silica having a number average particle size of 120 Å, 0.6 part of magnesium oxide (magnesia) and 0.4 part of a 25 weight percent aqueous solution of di-isobutylene-maleic anhydride sodium salt.

The resole resin and the adjuncts are blended for about 2 minutes at a speed of about 15,000 to 20,000 rpm. The resulting stabilized resole resin is a thixotropic liquid having a creamy smooth appearance and viscosity of about 140,000 cps (HBT type Brookfield viscometer, TA spindle, heliopath, at 5 rpm). It is conveyed to a container for storage at ambient conditions. After three months of storage, the container is inspected, revealing a thixotropic liquid having no distinct water layer.

To the stabilized resin composition is added 107 parts of a catalyst comprising a mixture of 20 weight percent trichloroacetic acid and 80 weight percent of benzene sulfonyl chloride. The catalyst is blended by hand into the resin composition.

The catalyzed resin composition is placed in airless spray equipment and sprayed on the surfaces of a holding tank. The surfaces are sand blasted steel which have been primed with a vinyl ester resin sold as DERAKANE ® by The Dow Chemical Company. The resin coating is allowed to cure at ambient conditions for about 24 hours. At this time the cured resin coating is a hard, solvent-resistant coating. Visual inspection shows the coating to be free of pinholes and other imperfections.

The storage tank with the cured resin coating contains a mixture of aluminum chloride, hydrochloric acid, ethylbenzene and water at temperatures of about 50°–60° C. After a period of 19 months there is no noticeable degradation in the coating and no substantial loss of adhesion between the coating and the DERAKANE ® coated steel surfaces.

What is claimed is:

1. A method of preparing a coating from a stabilized phenolic resole resin composition of a phenolic resole resin and an amount of a finely divided, water absorbent powder having a number average particle size of less than about 5,000 Å sufficient to reduce the amount of a distinct, water rich phase formed in the phenolic resole resin; said method comprising the steps of:
    (a) adding a catalytic amount of an acid to the stabilized resole resin composition;
    (b) applying the catalyzed resole resin composition to a suitable substrate; and
    (c) subjecting the catalyzed resole resin composition to conditions sufficient to cure the resin on the substrate.

2. The method of claim 1 wherein the acid catalyst is employed in an amount from about 0.1 to about 15 weight percent based on the weight of the resole resin and the catalyzed resole resin composition is subjected to temperatures from about 20° to about 100° C.

3. The method of claim 2 wherein the finely divided powder is a fumed inorganic powder.

4. The method of claim 3 wherein the phenolic resole resin is the reaction product of phenol and formaldehyde or a formaldehyde generating material, the catalyst is employed in an amount from about 0.2 to about 10 weight percent based on the weight of the resole resin and the catalyzed resole resin composition is subjected to temperatures from about 20° to about 100° C. to cure the resin.

5. The method of claim 4 wherein the stabilized resole resin composition comprises from about 0.5 to about 5 weight percent of the fumed powder based on the weight of the phenolic resole resin and the fumed inorganic powder is fumed silicon dioxide, fumed titanium dioxide or fumed aluminum oxide having a number average particle size of less than about 400 Å.

6. The method of claim 5 wherein the fumed inorganic powder is fumed silicon dioxide.

7. The method of claim 1 wherein the acid catalyst is employed in conjunction with an organic sulfonyl chloride.

8. The method of claim 7 wherein the acid catalyst is employed as a mixture of from about 5 to about 50 weight percent of the acid and from about 95 to about 50 weight percent of benzene sulfonyl chloride, said weight percents being based on the amount of acid and sulfonyl chloride.

* * * * *